United States Patent
Kubo (10) Patent No.: US 6,961,089 B2
(45) Date of Patent: Nov. 1, 2005

(54) DIGITAL CAMERA THAT DISPLAYS A PREVIOUSLY CAPTURED IMAGE ON AN LCD WHEN A HALF-MIRROR IS IN MOTION

(75) Inventor: Hiroaki Kubo, Muko (JP)

(73) Assignee: Minolta Co., Ltd., Osaka (JP)

( * ) Notice: Subject to any disclaimer, the term of this patent is extended or adjusted under 35 U.S.C. 154(b) by 766 days.

(21) Appl. No.: 09/741,129

(22) Filed: Dec. 19, 2000

(65) Prior Publication Data

US 2001/0005231 A1 Jun. 28, 2001

(30) Foreign Application Priority Data

Dec. 24, 1999 (JP) .......................................... 11-366055

(51) Int. Cl.[7] ............................................. H04N 5/222
(52) U.S. Cl. ................................................. 348/333.01
(58) Field of Search ..................................... 348/333.01

(56) References Cited

U.S. PATENT DOCUMENTS

| | | | | |
|---|---|---|---|---|
| 4,677,489 A | * | 6/1987 | Nishimura et al. | 348/366 |
| 4,757,387 A | * | 7/1988 | Saito | 348/342 |
| 4,809,076 A | * | 2/1989 | Todaka et al. | 348/230.1 |
| 5,459,511 A | * | 10/1995 | Uehara et al. | 348/335 |
| 5,936,668 A | * | 8/1999 | Sawanobori et al. | 348/333.01 |
| 6,639,626 B1 | * | 10/2003 | Kubo et al. | 348/218.1 |
| 6,710,808 B1 | * | 3/2004 | Yamagishi | 348/362 |
| 6,741,284 B1 | * | 5/2004 | Shono | 348/349 |

FOREIGN PATENT DOCUMENTS

| | | |
|---|---|---|
| JP | 10-055023 | 2/1998 |
| JP | 10-098640 | 4/1998 |
| JP | 10-108046 | 4/1998 |
| JP | 11-183978 | 7/1999 |

* cited by examiner

Primary Examiner—Wendy R. Garber
Assistant Examiner—James M. Hannett
(74) Attorney, Agent, or Firm—Sidley Austin Brown & Wood LLP (57) ABSTRACT

When an instruction to record an image is provided while a live view is being displayed, the image shot immediately before the provision of the instruction is displayed while a half mirror is moving to retract from the optical path, and the image to be recorded shot immediately therebefore is displayed while the half mirror is moving to advance onto the optical path. To indicate that shooting, preparations and recording of the image to be recorded are in progress, the brightness of the displayed image is gradually changed.

16 Claims, 10 Drawing Sheets

DIGITAL CAMERA THAT DISPLAYS A PREVIOUSLY CAPTURED IMAGE ON AN LCD WHEN A HALF-MIRROR IS IN MOTION

This application is based on the application No. 11-366055 filed in Japan, the content of which is hereby incorporated by reference.

BACKGROUND OF THE INVENTION

1. Field of the Invention

The present invention relates to a digital camera displaying an image that is being shot, and more particularly, to a digital camera in which the optical path is split so that light from the taking lens is directed to an optical finder.

2. Description of the Related Art

Generally, digital cameras are provided with a display such as a liquid crystal display, and the display is used for displaying shot and recorded images for the purpose of reproduction and for displaying the image that is being shot. The user can set the composition and confirm the focus condition while viewing the displayed image that is being shot, that is, a live view. Thus, the display functions as a video finder.

Some digital cameras are provided with an optical finder in addition to the display. Digital cameras provided with an optical finder include a separate type in which light is directed to the finder without passing through the taking lens, and a single-lens reflex (SLR) type in which light having passed through the taking lens is reflected to be directed to the finder. In the separate type, a parallax is caused between the finder and the taking lens, whereas in the SLR type, inherently, no parallax is caused.

The SLR type is provided with a prism disposed on the optical path leading from the taking lens to an image sensing device which prism reflects part of the light having passed through the taking lens and transmits the remainder of the light, and a pentagonal prism directing the reflected light to the user's eye and erecting the viewed image. In this structure, the optical finder and the video finder can be used at the same time. However, the light directed to the image sensing device is always part of the light having passed through the taking lens, so that excellent images cannot be provided in shooting under low light conditions.

As well known, in SLR cameras in which silver halide film is exposed, it has conventionally been performed to obliquely dispose a totally reflecting mirror on the optical path leading from the taking lens to the film and pivot the mirror so as to retract from the optical path. The mirror is situated on the optical path until immediately before shooting, that is, film exposure so that light is reflected toward the pentagonal prism. The mirror is retracted from the optical path at the time of shooting so that light is directed to the film, and is advanced onto the optical path immediately after shooting. Mirrors of this type are called quick return mirrors.

Digital cameras provided with such a quick return mirror have also been commercialized. In these cameras, the use of an optical finder and shooting of bright images are both achieved. However, in this structure, the display cannot be used as the finder while the totally reflecting mirror is situated on the optical path in order to use the optical finder, because no light is incident on the image sensing device during this period.

To solve this problem, a digital camera having a half mirror as the quick return mirror has been proposed. Light is incident on the image sensing device both when the half mirror is situated on the optical path and when it is retracted from the optical path, so that shooting and display can be always performed. The optical finder can be also used while the half mirror is situated on the optical path. When an image to be recorded is shot, all the light from the taking lens can be used for shooting by retracting the half mirror from the optical path.

However, in the digital camera having a half mirror as the quick return mirror, differences in brightness among parts are caused in images shot while the mirror is moving to retract from the optical path and while the mirror is moving to advance onto the optical path. This is because while the mirror is moving, the mirror covers only part of the optical path and because of this, light from the taking lens is directly incident on part of the image sensing device and light whose quantity has been reduced by passing through the half mirror is incident on the remainder of the image sensing device. When such images are displayed on the display, differences in brightness are clearly recognized, so that an impression that noises are caused in a series of live views on the display is given to the user.

On the other hand, there is a control method in which a live view is displayed and the half mirror used as the quick return mirror is held on the optical path even when an image to be recorded is shot. In this case, although only part of the light having passed through the taking lens is used for shooting like in the structure in which the optical path is split by the prism, the problem that differences in brightness among parts are caused in images shot while the mirror is moving is solved. However, in that case, since no specific change is caused in the displayed images, the user who provided an image recording instruction by operating the shutter release button cannot be sure that the operation was correctly performed.

By displaying the images in which there are differences in brightness among parts, the user can be informed that the image to be recorded has been shot. However, the defect that the impression of noises being caused is given weight more than the advantage, so that it can be said that is it undesirable to display the images shot while the mirror is moving.

Generally, when an image other than an image to be recorded is shot, the diaphragm is fully opened to provide a bright finder image, and only when an image to be recorded is shot, the aperture of the diaphragm is adjusted to perform exposure control. Including such control, when an image to be recorded is shot, the number of preparations to be made is larger than when an image other than an image to be recorded is shot. However, when the live view display is continued even after the user provides a recording instruction, it is necessary to perform processing to provide the live view display in addition to the preparations for shooting of the image to be recorded, so that the start of shooting of the image to be recorded is apt to be delayed.

The present invention is made in view of these problems, and an object thereof is to provide a digital camera using an optical finder and a video finder at the same time, said digital camera being capable of always displaying stable images.

Another object of the present invention is to provide a digital camera capable of informing the user that an image to be recorded has been shot, without discomforting the user.

Yet another object of the present invention is to provide a digital camera capable of promptly responding to the user's instruction to record an image.

SUMMARY OF THE INVENTION

To achieve the above-mentioned objects, a digital camera according to an aspect of the present invention comprises: a taking lens; an image sensor for receiving light from the taking lens to produce an image data; a display for displaying the image data produced by the image sensor; a recorder for recording the image data produced by the image sensor into a recording medium; an instruction member for providing an instruction to record an image data into the recording medium; an optical element disposed so as to be situated in an advanced position that intersects an optical path leading from the taking lens to the image sensor and in a retracted position that is off the optical path; a finder for receiving light reflected at the optical element situated in the advanced position to provide a visible image; a driver for moving the optical element to the retracted position when the instruction to record an image data is provided by the instruction member, and for moving the optical element to the advanced position after shooting of the image to be recorded into the recording medium is finished; a memory for storing an image data produced by the image sensor until the instruction by the instruction member is provided; and a controller for displaying the image data stored in the memory on the display from the provision of the instruction by the instruction member to the end of shooting of the image to be recorded into the recording medium.

To achieve the above-mentioned objects, a digital camera according to another aspect of the present invention comprises: a taking lens; an image sensor for receiving light from the taking lens to produce an image data; a display for displaying the image data produced by the image sensor; a recorder for recording the image data produced by the image sensor into a recording medium; an instruction member for providing an instruction to record an image data into the recording medium; and a controller for gradually changing the image displayed on the display for a predetermined period of time from the provision of the instruction by the instruction member.

BRIEF DESCRIPTION OF THE DRAWINGS

In the following description, like parts are designated by like reference numbers throughout the several drawings.

DETAILED DESCRIPTION OF THE PREFERRED EMBODIMENT

Figure 1:
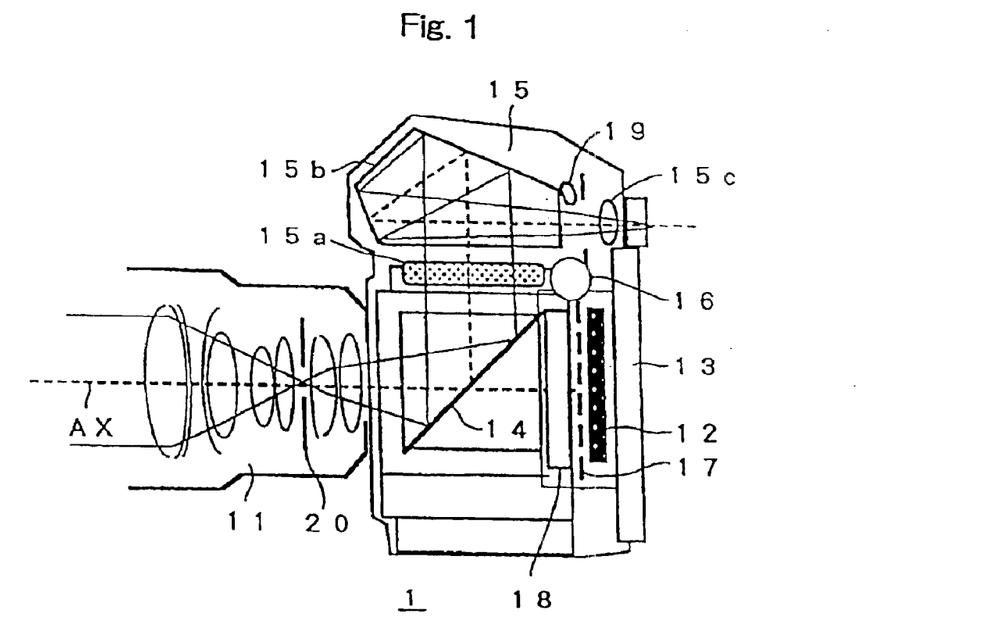
FIG. 1 is a cross-sectional view showing the optical structure of a digital camera according to an embodiment of the present invention.
Figure 2:
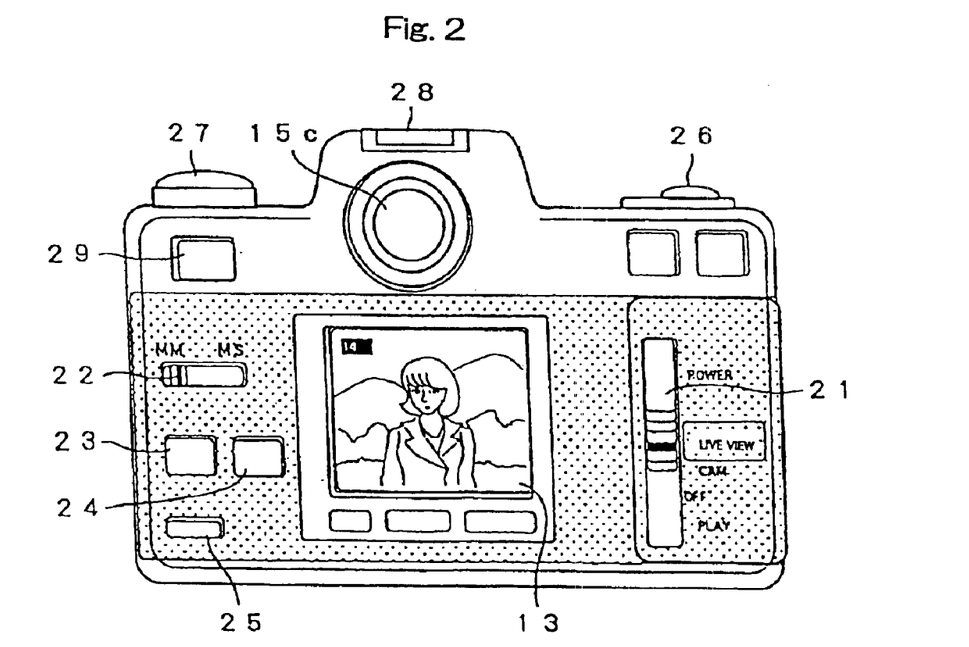
FIG. 2 is a rear view of the digital camera.

Hereinafter, an embodiment of the digital camera according to the present invention will be described with reference to the drawings. A cross-sectional view of a digital camera 1 of this embodiment is shown in FIG. 1. The rear view thereof is shown in FIG. 2.

As shown in FIG. 1, the digital camera 1 has a taking lens 11, a charge coupled device (CCD) 12 as an image sensing device, a liquid crystal display (LCD) 13 as a display, a half mirror 14, and an optical finder 15. The taking lens 11 images light from the subject of shooting on the light receiving surface of the CCD 12. The CCD 12 is disposed perpendicularly to the optical axis Ax of the taking lens, and converts the light from the taking lens 11 into electric signals to shoot an image. Image shooting by the CCD 12 is repeated substantially in a predetermined cycle. The LCD 13 is disposed on the rear surface of the digital camera 1, and displays images shot by the CCD 12 and messages for the user.

The half mirror 14 is disposed between the taking lens 11 and the CCD 12. The half mirror 14 has at its upper end a pivot vertical to the optical axis of the taking lens 11, and is pivoted so as to be situated in an advanced position that intersects the optical path leading from the taking lens 11 to the CCD 12 and in a retracted position that is off the optical path. The half mirror 14 intersects the optical axis AX at an angle of 45 degrees when situated in the advanced position, and is substantially parallel to the optical axis AX when situated in the retracted position. The transmittance of the half mirror 14 is approximately 60%. To drive the half mirror 14, an actuator 16 is disposed in the vicinity of the upper end of the half mirror 14.

The optical finder 15 comprises a focusing screen 15a, a pentagonal prism 15b and an eyepiece 15c. The screen 15a is disposed parallel to the optical axis Ax of the taking lens 11, and images the light reflected at the half mirror 14 situated in the advanced position. The distance from the point of intersection of the optical axis Ax and the half mirror 14 to the light receiving surface of the CCD 12 and the distance from the point of intersection to the imaging surface of the screen 15a are the same, and the positions of these surfaces are optically equivalent. The user can view an erected image equivalent to the image on the CCD 12 by viewing the image on the screen 15a through the eyepiece 15c and the pentagonal prism 15b.

A focal plane shutter 17 for switching between incidence and interception of light on and from the CCD 12 is disposed immediately before the CCD 12. Further, a low-pass filter 18 for removing high frequency components is disposed between the half mirror 14 and the shutter 17. In the optical finder 15, a photometric device 19 for measuring the quantity of the light from the prism 15b is disposed. The light quantity measured by the photometric device 19 is used for the exposure control of the CCD 12, and is also used for automatic light control when flash shooting is performed. In the vicinity of the pupil of the taking lens 11, a diaphragm 20 for limiting the luminous flux diameter to control the exposure of the CCD 12 is disposed.

As shown in FIG. 2, on the rear surface of the digital camera 1, two slide switches 21 and 22, three push button switches 23, 24 and 25 and a speaker 29 are provided in addition to the LCD 13. On the top surface, a release button 26, a dial 27 and a flash attachment portion 28 are provided.

The switch 21 is used for turning on and off the power and for setting operation modes. The digital camera 1 has a shooting mode in which an image is shot by the CCD 12 and the shot image is recorded into a record medium in response to the user's instruction and a reproduction mode in which a recorded image is reproduced and displayed on the LCD 13. In the shooting mode, a live view display in which the subject of shooting is displayed as a moving image can be provided by repeating shooting of an image and display of the shot image on the LCD 13 in a predetermined cycle (for example, 1/30 second).

When the switch 21 is in the "OFF" position, no power is supplied, so that the digital camera 1 is deactivated. When the switch 21 is in the "PLAY" position, the reproduction mode is set. When the switch 21 is in the "LIVE VIEW" position, the shooting mode in which the live view is displayed is set. When the switch 21 is in the "CAM" position, the shooting mode in which no live view is displayed is set.

The digital camera 1 has two modes associated with the position of the half mirror 14 at the time of shooting. In one mode, the half mirror 14 operates as a quick return mirror. Specifically, in this mode, until an instruction to record an image is provided, shooting is performed with the half mirror 14 being held in the advanced position, and when the recording instruction is provided, the half mirror 14 is moved to the retracted position. Then, the image shot after the movement of the half mirror 14 is finished is recorded, and after the shooting of the image, the half mirror 14 is advanced to the advanced position. This mode will hereinafter be referred to as mirror driven mode. In the other mode, shooting is performed with the half mirror 14 being always held in the advanced position regardless of the presence or absence of the recording instruction. This mode will hereinafter be referred to as mirror stationary mode.

Switching between these modes is made by the switch 22. When the switch 22 is in the "MM" position, the mirror driven mode is set. When the switch 22 is in the "MS" position, the mirror stationary mode is set.

The release button 26 generates a signal S1 when half depressed, and further generates a signal S2 when fully depressed. The digital camera 1 adopts automatic focusing in which focusing of the taking lens 11 is performed based on the image shot by the CCD 12, and the signal S1 provides an instruction to start automatic focusing. The signal S1 also provides, for the exposure control of the CCD 12, an instruction to start the calculation of the aperture value of the diaphragm 20 and the value of the time of the photoelectric conversion by the CCD 12 (electronic shutter speed) based on the output of the photometric device 19.

The signal S2 provides an instruction to record the shot image. When the signal S2 is generated, first, the previously calculated aperture value and electronic shutter speed are set. In the mirror driven mode, driving of the half mirror 14 to the retracted position is also performed. After these processings are finished, the shot image is recorded.

When an image to be recorded is shot, a short sound for indicating that the image to be recorded is shot may be emitted through the speaker 29 or the brightness of the image displayed on the LCD 13 may be changed. The switches 23 and 24 are used for setting whether to use these functions or not.

The digital camera 1 uses a detachably attachable memory card as an image record medium. The images to be recorded can be compressed. The switch 25 is used for setting whether to perform compression or not. Methods of the exposure control includes the following three: aperture priority, shutter speed priority, and program. The dial 27 is used for setting these.

Figure 3:
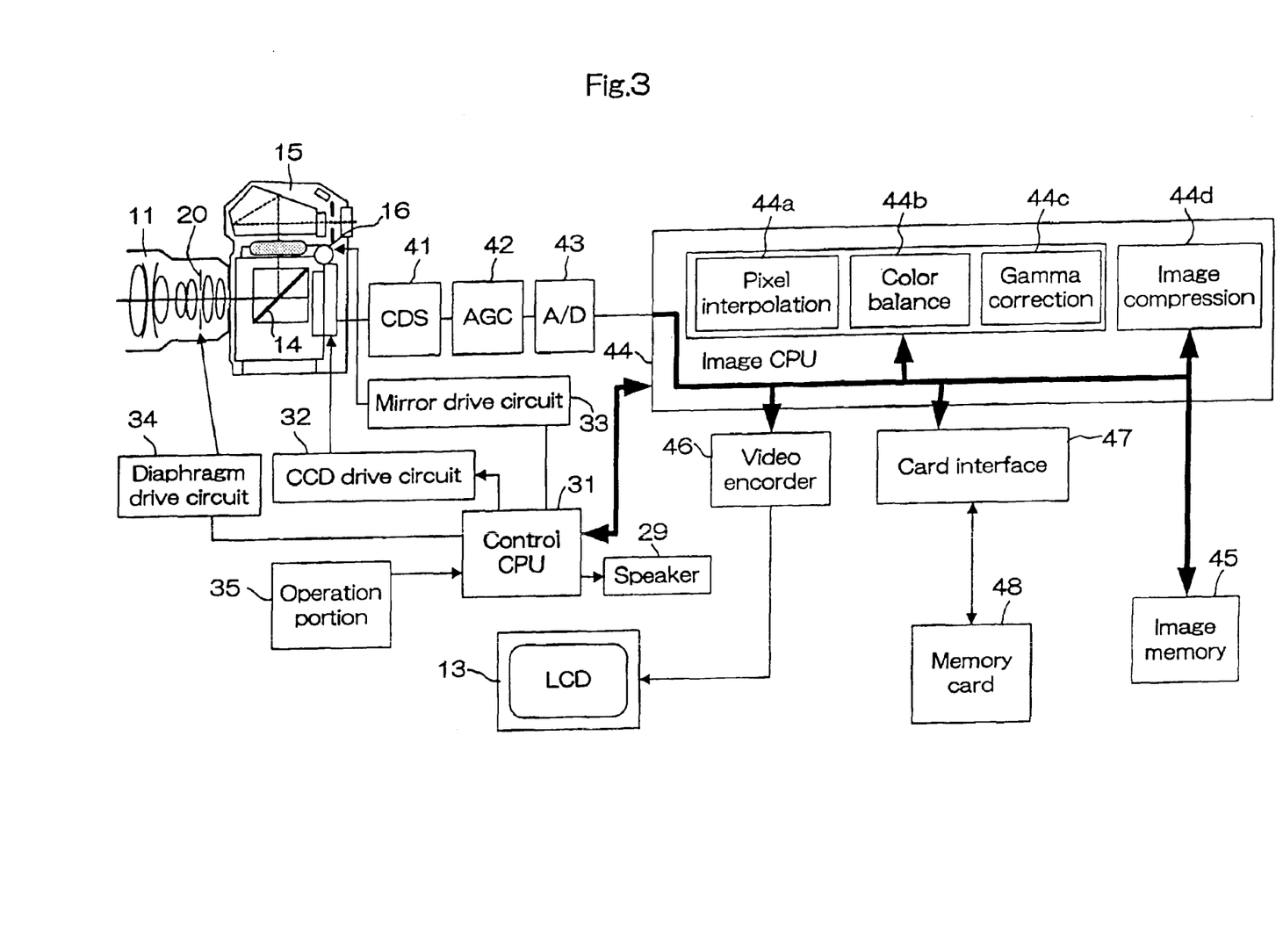
FIG. 3 is a block diagram showing the circuit configuration of the digital camera.

The circuit configuration of the digital camera 1 is schematically shown in FIG. 3. The digital camera 1 has a CPU (central processing unit) 31, a CCD drive circuit 32, a mirror drive circuit 33, a diaphragm drive circuit 34, an operation portion 35, a CDS (correlated double sampling) circuit 41, an AGC (automatic gain control) circuit 42, an A/D (analog-to-digital) converter 43, a CPU 44, an image memory 45, a video encoder 46 and a card interface 47.

The CPU 31 controls operations of the entire digital camera 1. The CPU 31 will hereinafter be referred to as control CPU. The CCD drive circuit 32 generates clocks for providing operation timing and supplies the clocks to the CCD 12, thereby controlling operations of the CCD 12 such as the start of the photoelectric conversion and the output of charges accumulated through the photoelectric conversion. The mirror drive circuit 33 provides an instruction to the actuator 16 to control the movement of the half mirror 14. The diaphragm drive circuit 34 controls the aperture value (aperture diameter) of the diaphragm 20 through a non-illustrated drive mechanism. These controls are performed based on instructions from the control CPU 31.

The operation portion 35 includes various operation members such as the switches 21 to 25, the release button 26 and the dial 27, and transmits operations performed by the user to the control CPU 31.

The CDS circuit 41 reduces noises of analog signals output by the CCD 12, and by the gain thereof, the AGC circuit 42 adjusts the levels of all the signals from the CDS circuit 41. The A/D converter 43 converts the analog signals from the AGC circuit 42 into 10-bit digital signals.

The CPU 44 generates image data representative of an image by processing the signals converted into digital signals. The CPU 44 will hereinafter be referred to as image CPU. The output of the A/D converter 43 is temporarily stored in the image memory 45. The image CPU 44 reads signals from the image memory 45 and performs pixel interpolation, color balance processing and gamma correction on the read signals to generate image data. The CPU 44 also performs a processing to change the image brightness for a change in the displayed image described later.

The pixel interpolation 44a is to interpolate pixel signals of three kinds of R (red), G (green) and B (blue) alternately disposed on the CCD 12. The color balance processing 44b is to individually correct the gains of the signals of the three colors having undergone the interpolation so that the color of the subject of shooting is correctly expressed. The gamma correction 44c is to perform non-linearization conversion on the signals having undergone the gain correction so that the gradation is suitable for the LCD 13. The image CPU 44 again stores the signals having undergone these processings in the image memory 45 as image data.

The image CPU 44 reads image data from the image memory 45 and supplies it to the video encoder 46. The video encoder 46 encodes the supplied image data according to the NTSC system, and supplies the encoded image data to the LCD 13 so as to be displayed as an image.

In the memory card 48, image data is recorded. The card interface 47 is for writing into the memory card 48 and reading from the memory card 48. When an instruction is provided from the control CPU 31 in response to the signal S2, the image CPU 44 reads image data from the image memory 45 and supplies it to the card interface 47 so as to be recorded into the memory card 48. When an instruction to compress the image data is provided from the control CPU 31, the image CPU 44 performs JPEG data compression 44d on the image data before recording it into the memory card 48.

In the reproduction mode, the image CPU 44 reads image data recorded on the memory card 48 through the card interface 47 in response to the instruction of the control CPU 31, and stores the image data into the image memory 45 after performing a processing reverse to the compression processing when necessary. Then, the image data is read and supplied to the video encoder 46 so as to be displayed on the LCD 13.

Figure 4A:
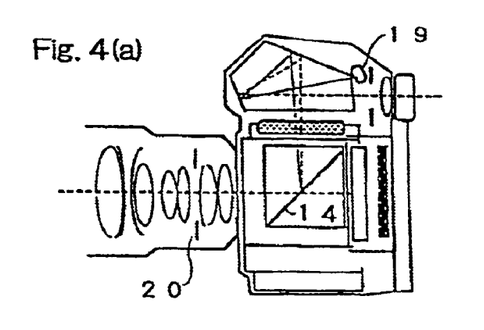
FIGS. 4(a) to 4(d) are cross-sectional views of the digital camera in shooting in a mirror driven mode.
Figure 4B:
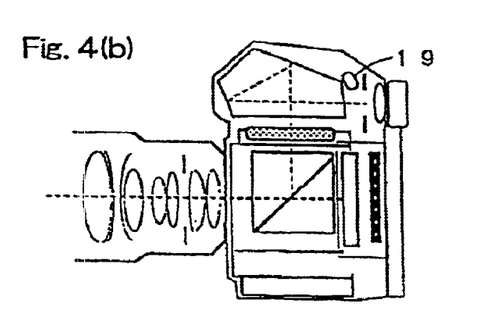

Cross-sectional views of the digital camera 1 in shooting in the mirror driven mode are shown in FIGS. 4(a) to 4(d). FIG. 4(a) shows a condition where only the signal S1 is generated. The half mirror 14 is in the advanced position and the photometric measurement by the photometric device 19 is being performed. The diaphragm 20 is fully opened. FIG. 4(b) shows a condition where the signal S2 providing the image recording instruction is generated. The half mirror 14 is in the advanced position at this point of time, and is moved to the retracted position thereafter. The photometric measurement by the photometric device 19 is stopped.

Figure 4C:
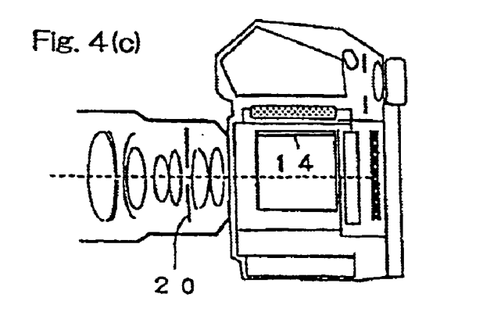
Figure 4D:
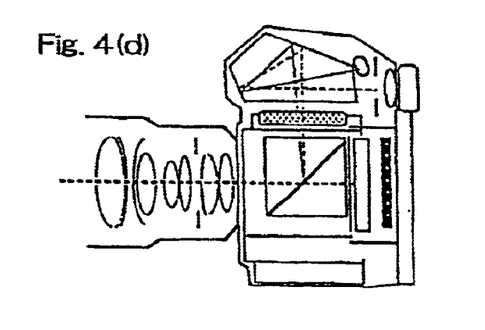

FIG. 4(c) shows a condition where an image to be recorded is being shot. The half mirror 14 is in the retracted position. The diaphragm 20 is stopped down based on the result of the photometric measurement in the condition of FIG. 4(a). FIG. 4(d) shows a condition where the signal S1 of after the shooting of the image to be recorded is finished is generated. The half mirror 14 is advanced to the advanced position, the photometric measurement by the photometric device 19 is resumed, and the diaphragm 20 is fully opened.

In the digital camera 1, when a live view is displayed in the mirror driven mode, in order to avoid displaying images where there are differences in brightness among parts which images are shot while the half mirror 14 is moving to the retracted position, the image represented by the image data stored in the image memory 45, that is, the image shot immediately before the signal S2 is generated is displayed on the LCD 13 after the recording instruction is provided by the signal S2. Although the CCD 12 continues operating during that time, the image CPU 44 stops the processings from the pixel interpolation to the gamma correction, and repeats only the reading of image data from the image memory 45 and the output of the read out image data to the video encoder 46.

When the movement of the half mirror 14 to the retracted position and the setting of the diaphragm 20 are finished through control by the control CPU 31, the image CPU 44 resumes the processings from the pixel interpolation to the gamma correction. Consequently, the image to be recorded is shot, and the image data thereof is stored in the image memory 45.

After the image data to be recorded is stored in the image memory 45, in order to avoid displaying images where there are differences in brightness among parts which images are shot while the half mirror 14 is moving to the advanced position, the image represented by the newly stored image data to be recorded is displayed on the LCD 13. During that time, the image CPU 44 stops the processings from the pixel interpolation to the gamma correction, and performs the reading of image data from the image memory 45 and the output of the read out image data to the video encoder 46. Moreover, the image data is read from the image memory 45, is compressed when there is the compression instruction, is output to the card interface 47 and is recorded onto the memory 48.

To show the user the image shot as the image to be recorded, the image CPU 44 repeats the reading of image data from the image memory 45 and the output of the read out image data to the video encoder 46 for a short while even after the half mirror 14 is moved to the advanced position, and resumes the normal processing thereafter.

The control CPU 31 controls operations of the digital camera 1 in accordance with the progression of the processing by the image CPU 44, however, by the image CPU 44 stopping some of the processings, it becomes unnecessary for the control CPU 31 to wait until the processings are finished, so that the shooting preparations to be performed after the signal S2 is generated can be quickly performed.

When a live view is displayed in the mirror driven mode, the user can choose between two methods. A first method is to display an image on the LCD 13 in the same brightness even after the signal S2 providing the image recording instruction is generated. A second method is to gradually change the brightness of the display on the LCD 13 during the period from when the signal S2 is generated to when the image to be recorded is shot and the image CPU 44 resumes the normal processing. These methods are switched between by the setting of the switch 24.

Figure 5:
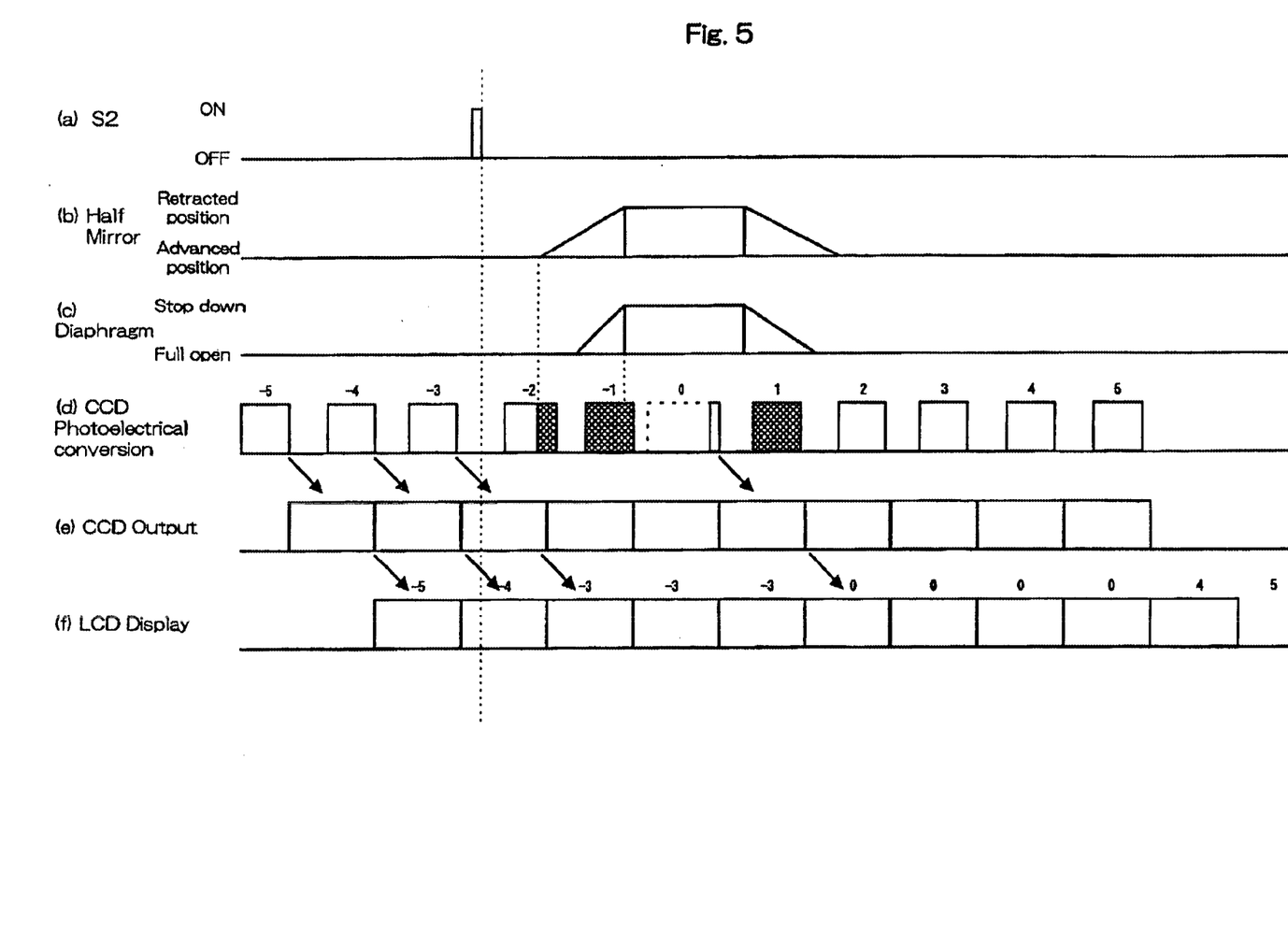
FIG. 5 is a timing chart showing an example of the operation periods of elements according to a first display method in the mirror driven mode of the digital camera.

An example of the operation timing of elements according to the first display method is shown in FIG. 5. In FIG. 5, (a) shows the signal S2 providing the recording instruction, (b) shows the condition of the half mirror 14, (c) shows the condition of the diaphragm 20, (d) shows the condition of the photoelectric conversion by the CCD 12, (e) shows the condition of the signal output from the CCD 12, and (f) shows the display on the LCD 13. The numbers in (d) and (f) are the frame numbers of shot images. The frame number of the image to be recorded is 0, the frame numbers of the preceding images are negative, and the frame numbers of the succeeding images are positive.

In this example, the signal S2 providing the image recording instruction is generated after the image of the frame number −3 is shot. The movement of the half mirror 14 to the retracted position is started in the middle of the shooting of the image of the frame number −2, and is finished in the middle of the shooting of the next image of the frame number −1. In the images of these two frames, differences in brightness among parts are caused. The checked portion in (d) show the condition where there are differences in brightness. The diaphragm 20 is stopped down in the middle of the shooting of the image of the frame number −1. The time of the photoelectric conversion of the image to be recorded of the frame number 0 varies according to the exposure control. The broken line in (d) shows the variation of the photoelectric conversion time. The photoelectric conversion times of the other frames are the same.

After the image to be recorded is shot, the movement of the half mirror 14 to the advanced position is started, and the movement is finished before the image of the frame number 2 is shot. Consequently, differences in brightness among parts are caused in the image of the frame number 1. The diaphragm 20 is also returned to the fully opened condition before the image of the frame number 2 is shot.

At the point of time when the signal S2 is generated, the CCD 12 has finished the shooting of the image of the frame number −3, and the image of the frame number −4 is displayed on the LCD 13. The signals of the image of the frame number −3 are processed by the image CPU 44 and stored in the image memory 45 as image data. This image is displayed on the LCD 13. The signals of the images of the frame numbers −2 and −1 are discarded without being processed although being output from the CCD 12. Consequently, the image data in the image memory 45 is not updated and the display of the image of the frame number −3 is continued on the LCD 13.

The signals of the image to be recorded of the frame number 0 are processed by the image CPU 44 and stored in the image memory 45 as image data. This image is displayed on the LCD 13. The image CPU 44 does not process the signals of the images of the frame numbers 1 to 3 and resumes the processing at the time of the signals of the image of the frame number 4. Consequently, the image to be recorded of the frame number 0 is displayed during the period of four frames, and the image of the frame number 4 is displayed in succession thereto.

Figure 6:
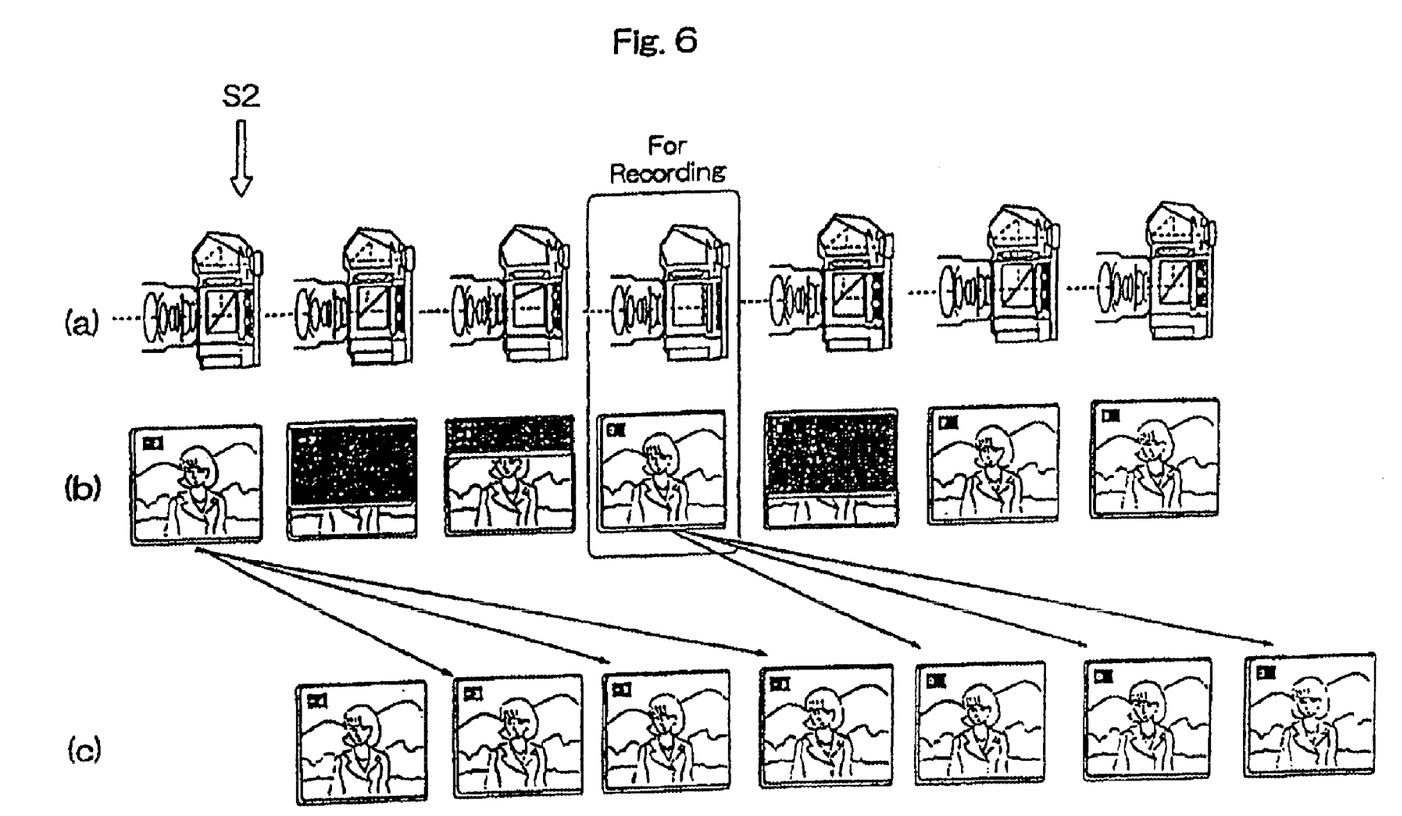
FIG. 6 is a view showing a relationship among a half mirror, shot images and displayed images in the example of FIG. 5.

A relationship among the movement of the half mirror 14, the images shot by the CCD 12 and the images displayed on the LCD 13 while the images of the frame numbers −3 to 4 are shot in the above-described example is shown in FIG. 6. Here, (a) shows the position of the half mirror 14, (b) shows the shot images, and (c) shows the displayed images. In (b), the images that are partly dark are ones where differences in brightness among parts are caused because of the movement of the half mirror 14.

During the period from when the signal S2 is generated to when the image to be recorded is shot and the processing of the signals thereof is finished, the image shot immediately before the generation of the signal S2 is repetitively displayed. After the image to be recorded is shot, the image to be recorded is displayed while images of several frames are shot. As described above, images where there are differences in brightness are never displayed.

Figure 7:
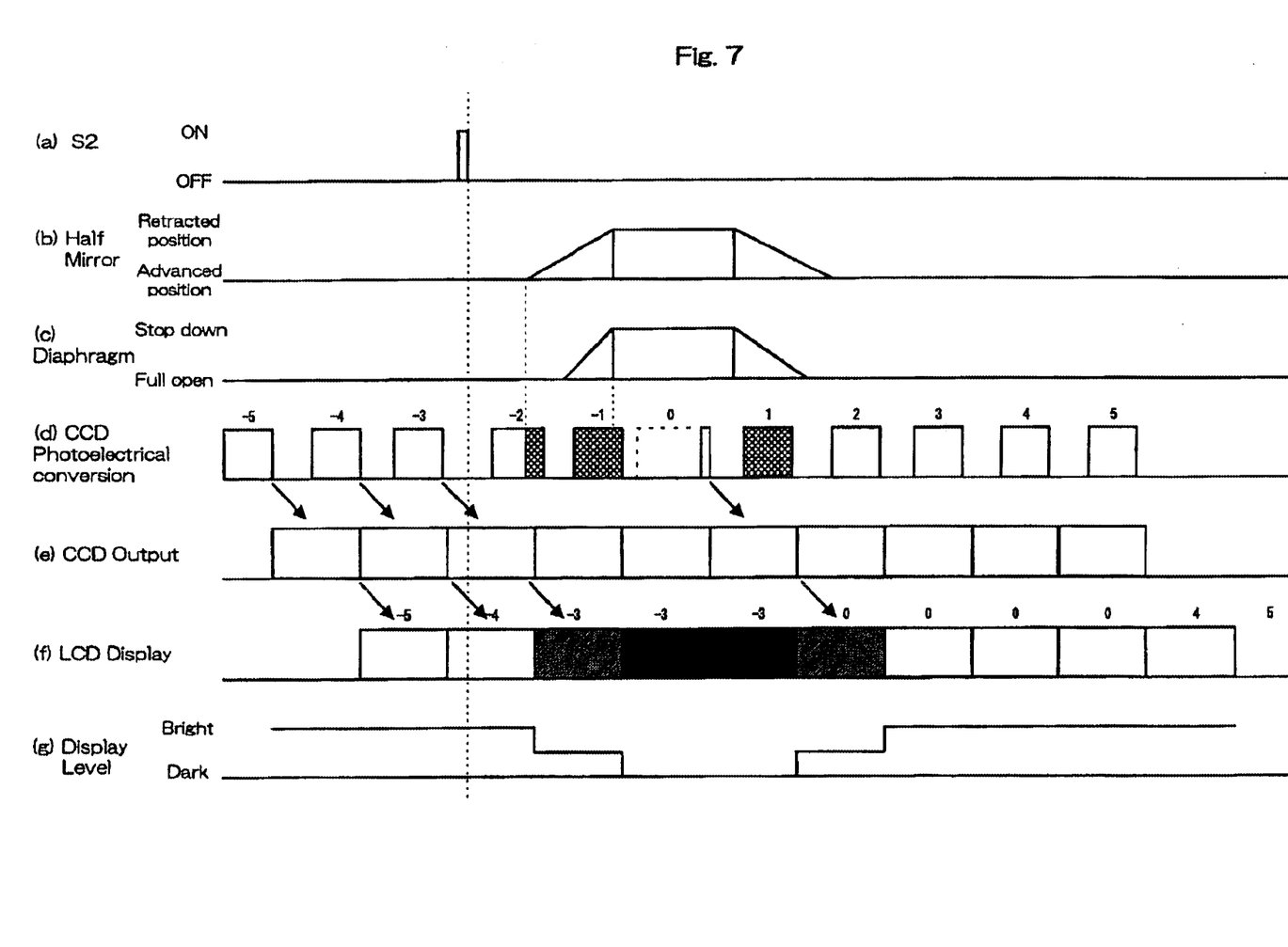
FIG. 7 is a timing chart showing an example of the operation periods of the elements according to a second display method in the mirror driven mode of the digital camera.

An example of the operation timing of the elements by the second display method in which the brightness of the displayed image is gradually changed is shown in FIG. 7. In FIG. 7, (a) to (f) show the same things as those of FIG. 5, and overlapping descriptions are omitted. (g) shows the display level of the LCD 13, that is, the brightness of the displayed image. The image of the frame number −3 shot immediately before the signal S2 is generated is displayed in somewhat low brightness at first, is displayed in lower brightness when the image to be recorded of the frame number 0 is shot, and is displayed in the same brightness during the period of the next one frame. The image to be recorded of the frame number 0 is displayed in somewhat low brightness at first, and is displayed in the normal brightness thereafter.

Figure 8:
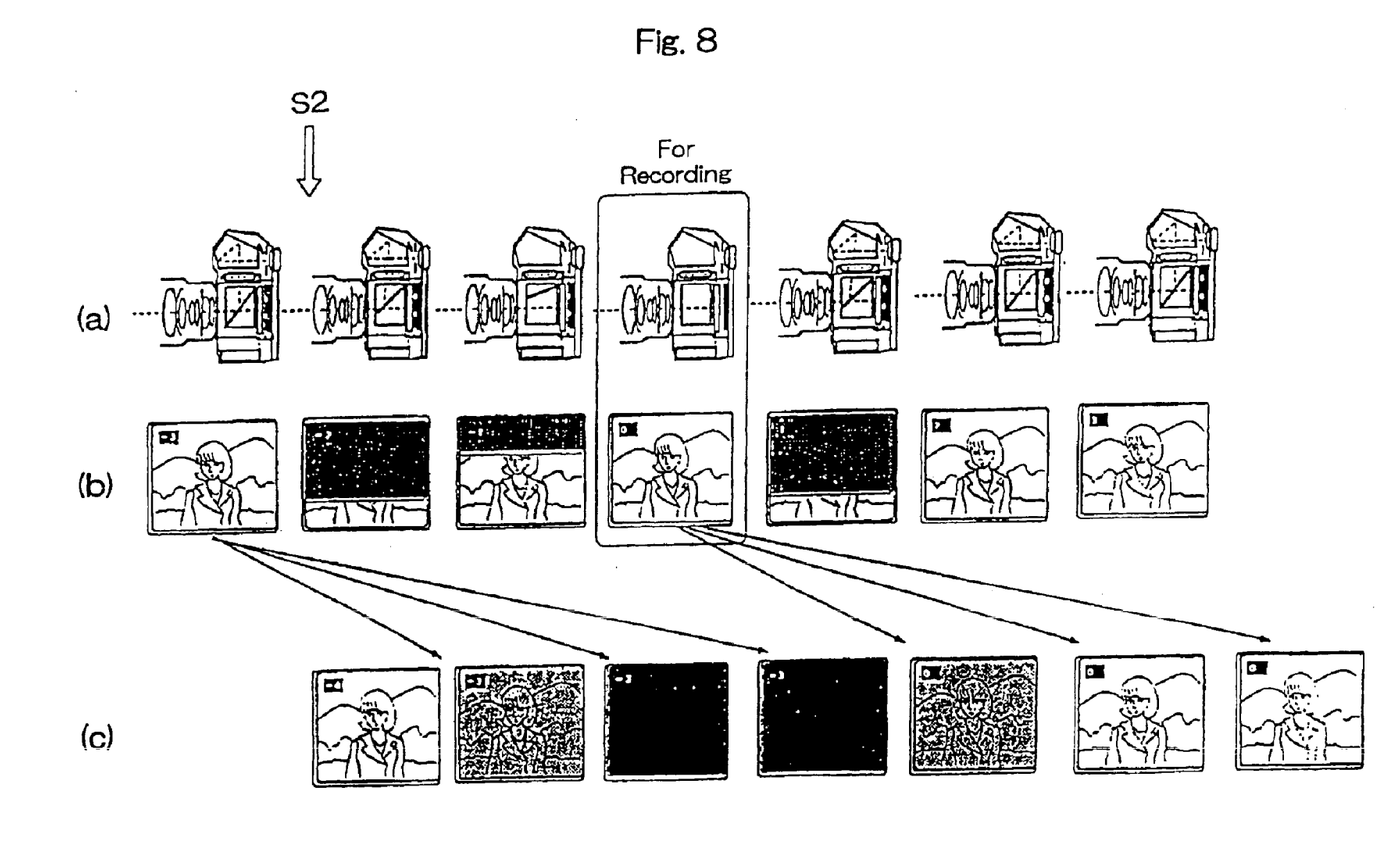
FIG. 8 is a view showing a relationship among the half mirror, shot images and displayed images in the example of FIG. 7.

A relationship among the movement of the half mirror 14, the images shot by the CCD 12 and the images displayed on the LCD 13 while the images of the frame numbers −3 to 4 are shot in the above-described example is shown in FIG. 8. (a) to (c) show the same things as those of FIG. 6. As shown in (c), the brightness of the images displayed on the LCD 13 gradually changes, and is lowest when the image to be recorded is being shot. By this change in brightness, the user can be informed that the image to be recorded is being shot.

Figure 9A:
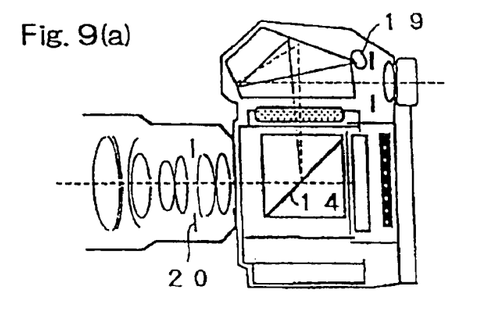
FIGS. 9(a) to 9(d) are cross-sectional views of the digital camera in shooting in a mirror stationary mode.
Figure 9B:
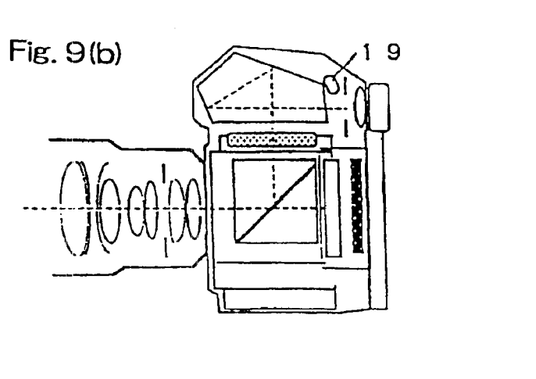
Figure 9C:
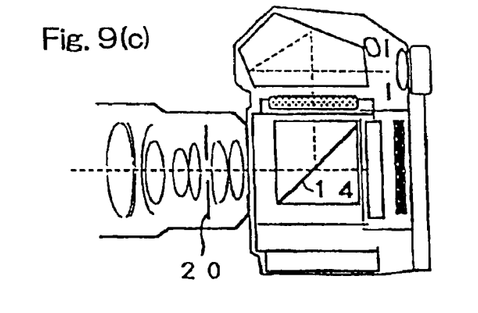
Figure 9D:
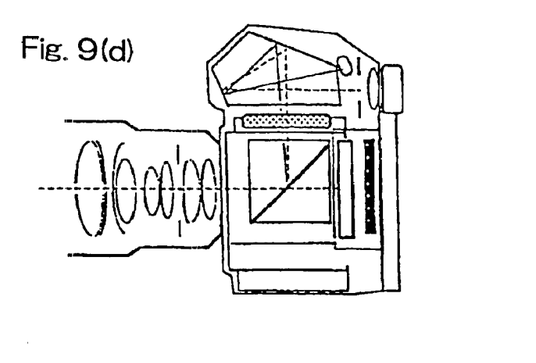

Cross-sectional views of the digital camera 1 in shooting in the mirror stationary mode are shown in FIGS. 9(a) to 9(d). FIG. 9(a) shows a condition where only the signal S1 is generated. FIG. 9(b) shows a condition where the signal S2 providing the image recording instruction is generated. FIG. 9(c) shows a condition where an image to be recorded is being shot. FIG. 9(d) shows a condition where the signal S1 of after the shooting of the image to be recorded is finished is generated. The half mirror 14 is always held in the advanced position, and the photometric measurement by the photometric device 19 is stopped from the generation of the signal S2 to the end of the shooting of the image to be recorded.

In the mirror stationary mode, since differences in brightness due to the movement of the half mirror 14 are never caused in the images, the images shot by the CCD 12 are successively displayed on the LCD 13 even after the signal S2 is generated. However, to show the user the image shot as the image to be recorded, after the image to be recorded is shot, the image is displayed over the period of shooting of several frames. This is realized by the image CPU 44 stopping the processings from the pixel interpolation to the gamma correction and not updating the image data in the image memory 45 as described above.

Figure 10:
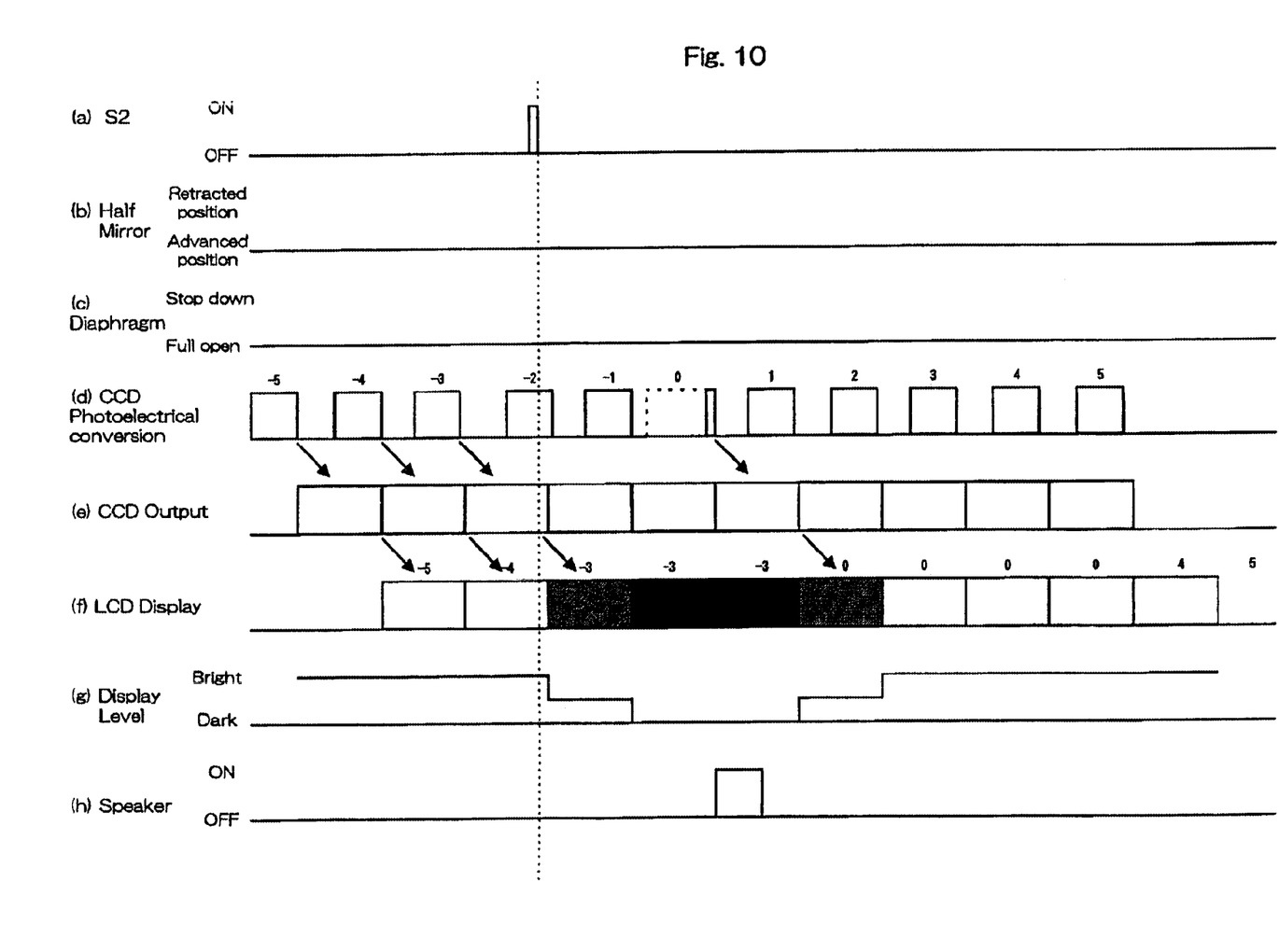
FIG. 10 is a timing chart showing an example of the operation periods of the elements in the mirror stationary mode of the digital camera.

An example of the operation timing of the elements in a case where a live view is displayed in the mirror stationary mode is shown in FIG. 10. In FIG. 10, (a) to (f) show the same things as those of FIG. 5. In this example, the image to be recorded is shot with the diaphragm 20 being fully opened. Moreover, since the half mirror 14 is not moved, the time from the generation of the signal S2 to the start of the shooting of the image to be recorded is shorter by one frame than in the examples of FIGS. 5 and 7.

(g) shows the display level of the LCD 13. After the signal S2 is generated, the brightness of the display on the LCD 13 is gradually changed. (h) shows the rumbling of the speaker 29. A predetermined sound is emitted through the speaker 29 immediately before the image to be recorded is displayed for the first time. The user can be informed that the image displayed after the emission of this sound is the image to be recorded. As mentioned above, whether to operate the speaker 29 or not can be set by the switch 23.

Figure 11:
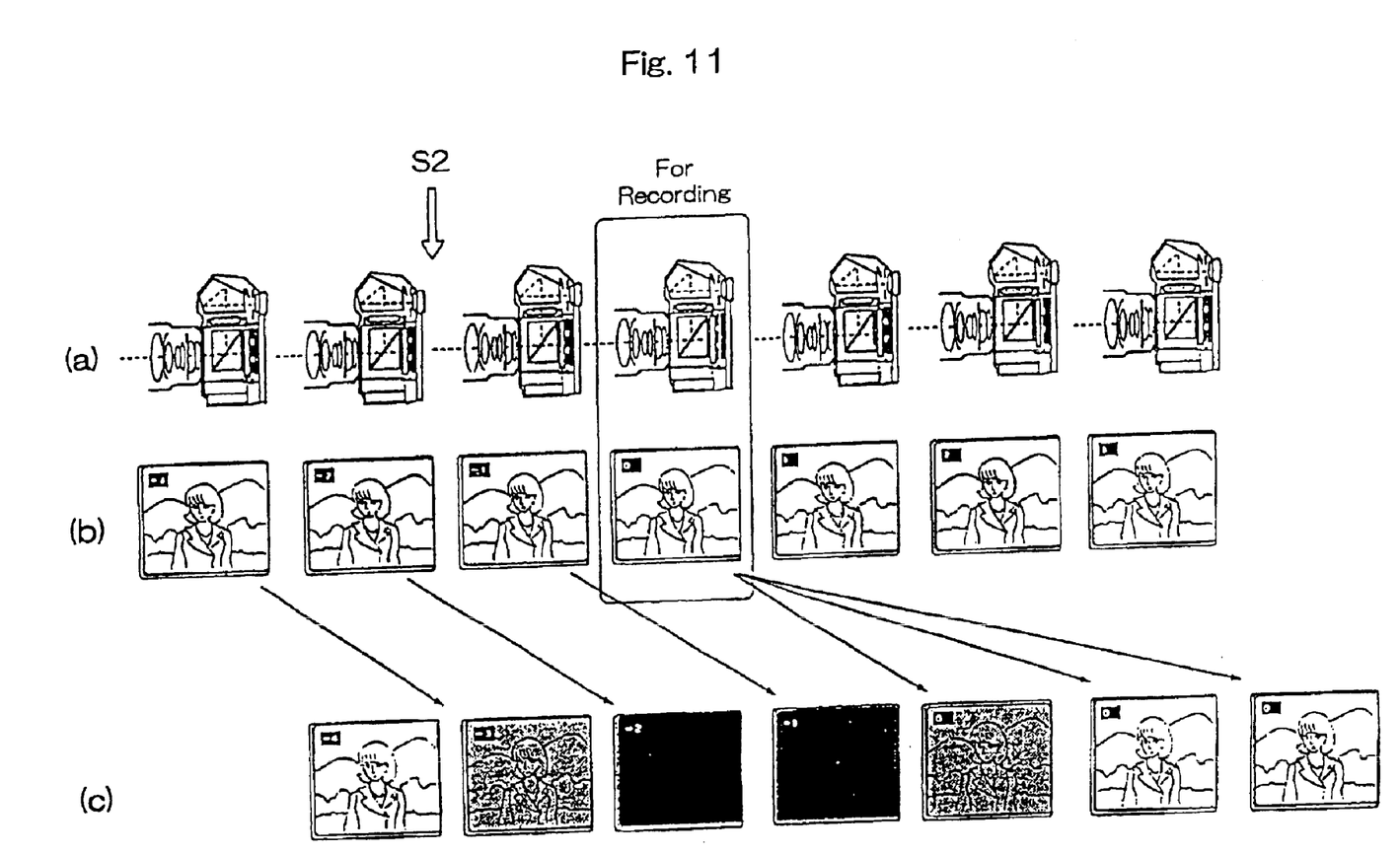
FIG. 11 is a view showing a relationship among the half mirror, shot images and displayed images in the example of FIG. 10.

A relationship among the movement of the half mirror 14, the images shot by the CCD 12 and the images displayed on the LCD 13 while the images of the frame numbers −3 to 4 are shot in the above-described example is shown in FIG. 11. (a) to (c) show the same things as those of FIG. 6. The images of the frame numbers −3 to −1 are successively displayed, and the brightness of the images displayed after the signal S2 is generated gradually changes and is lowest when the image to be recorded is shot. The image to be recorded is repetitively displayed in somewhat low brightness at first and in the normal brightness thereafter.

In this embodiment, to indicate that shooting of the image to be recorded, preparations therefor or post-processing is in progress, the brightness of the images displayed on the LCD 13 is changed. However, the chroma, that is, the vividness of colors of the displayed images may be changed. This can be easily realized by changing the intensity ratio among the R, G and B signals. In that case, (g) of FIGS. 7 and 10 shows the level of the chroma. When this is done, the displayed image is closest to monochrome when the image to be recorded is shot. Both when the brightness is changed and when the chroma is changed, the change is made over the entire area of the image and is gradually made. Therefore, the user is never discomforted by the change.

To indicate that shooting of the image to be recorded, preparations therefor or post-processing is in progress, the image brightness may be changed by adjusting the light quantity of a non-illustrated backlight provided in the LCD 13 instead of changing the brightness of the image displayed on the LCD 13.

While any sound may be used as the sound emitted through the speaker 29 for the user to confirm the image to be recorded, a sound imitating the shutter operation sound is preferable. This enables the user to feel as if he or she were using a camera of the type in which silver halide film is exposed.

As described above, in the digital camera of the present invention, when an instruction to record an image is provided, the half mirror is retracted from the optical path and the image to be recorded is shot, and the display of the live view by the display is stopped and the stored image is displayed instead. Consequently, images where there are differences in brightness among parts because of the half mirror being moved for retraction are never displayed. As a result, an undesirable impression of noises being caused can be prevented from being given to the user. Further, since the processing to display the images shot after the provision of the recording instruction is unnecessary, the time to the start of shooting of the image to be recorded can be reduced. Thus, a digital camera excellent in the responsibility to the recording instruction is obtained.

Moreover, in the structure where the image to be recorded is stored when it is shot and the display of the stored image to be recorded on the display is continued until the movement of the half mirror to the advanced position is finished, images where there are differences in brightness among parts because of the half mirror being moved to advance to the optical path are prevented from being displayed. Further, the user can view the image that is actually recorded.

Moreover, in the structure where the displayed image is gradually changed while the stored image is being displayed, the user easily finds that shooting of the image to be recorded, preparations therefor or post-processing is in progress.

Further, in the digital camera of the present invention, the image displayed on the display is gradually changed over a predetermined period from the provision of the recording instruction. If there is no specific change in the display provided after the provision of the recording instruction, it will be difficult for the user to find whether or not shooting of the image to be recorded or preparations therefor are in progress. This problem is particularly significant in digital cameras having no quick return mirror and digital cameras having a quick return mirror but having a shooting mode in which the quick return mirror is not operated, because it is impossible to inform the user of the operation of the camera by use of the operation sound of the quick return mirror. According to the present invention, by causing a change in the displayed image, the user can be clearly informed that shooting of the image to be recorded is correctly performed.

Further, in the structure where the stored image is displayed over a predetermined period from the provision of the storage instruction, the image being already shot and stored is displayed while preparations for shooting of the image to be recorded are being performed. This enables omission of the processing to display the images shot after the provision of the recording instruction, so that shooting of the image to be recorded can be promptly started. Consequently, a digital camera excellent in the responsibility to the recording instruction is obtained. The predetermined period may be, for example, the period to the end of shooting of the image to be recorded.

When the displayed image is gradually changed, by making the change largest when the image to be recorded is shot, the user can be informed of the time of shooting of the image to be recorded. This enables the user to easily determine whether the image to be recorded was shot at the desired time or not.

By the change made in the displayed image being a change in brightness or chroma, the user can easily recognize the change without being discomforted.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A digital camera comprising:
   a taking lens;
   an image sensor for receiving light from the taking lens to produce an image data;
   a display for displaying the image data produced by the image sensor;
   a recorder for recording the image data produced by the image sensor into a recording medium;
   an instruction member for providing an instruction to record an image data into the recording medium;
   an optical element disposed so as to be situated in an advanced position that intersects an optical path leading from the taking lens to the image sensor and in a retracted position that is off the optical path;
   a finder for receiving light reflected at the optical element situated in the advanced position to provide a visible image;
   a driver for moving the optical element to the retracted position when the instruction to record an image data is provided by the instruction member, and for moving the optical element to the advanced position after shooting of the image to be recorded into the recording medium is finished;
   a memory for storing the image data produced by the image sensor until the instruction by the instruction member is provided; and
   a controller for displaying the image data stored in the memory on the display from the provision of the instruction by the instruction member to the end of shooting of the image to be recorded into the recording medium.

2. A digital camera as claimed in claim 1, wherein said optical element is a half mirror.

3. A digital camera as claimed in claim 1, wherein said memory stores the image data produced immediately before the instruction by the instruction member.

4. A digital camera as claimed in claim 1, wherein said memory stores the image data when the image to be recorded into the record medium is shot, and said controller displays the image stored in the memory on the display until the movement of the optical element to the advanced position is finished.

5. A digital camera as claimed in claim 1, wherein said controller gradually changes the displayed image while the image stored in the memory is being displayed on the display.

6. A digital camera as claimed in claim 5, wherein said change in the displayed image data is a change in brightness or chroma of the image data.

7. A digital camera as claimed in claim 1, further comprising a switching member for switching a first mode in which the optical element moves to the retracted position and a second mode in which the optical element is held in the advanced position regardless of the presence or absence of the instruction by the instruction member.

8. A digital camera as claimed in claim 1, further comprising a sound indicator for notifying the timing of the recording of the image data to be recorded.

9. A digital camera comprising:

a taking lens;

an image sensor for receiving light from the taking lens to produce an image data;

a display for displaying the image data produced by the image sensor;

a recorder for recording the image data produced by the image sensor into a recording medium;

an instruction member for providing an instruction to record an image data into the recording medium; and a controller for gradually changing a characteristic of the image displayed on the display for a predetermined period of time from the provision of the instruction by the instruction member.

10. A digital camera as claimed in claim 9, further comprising a memory for storing a latest image data produced by the image sensor until the instruction by the instruction member.

11. A digital camera as claimed in claim 10, wherein said controller displays the image data stored in the memory on the display for a predetermined period of time from the provision of the instruction by the instruction member.

12. A digital camera as claimed in claim 9, wherein said controller makes the largest change in the displayed image when the image to be recorded into the recording medium is shot.

13. A digital camera as claimed in claim 9, wherein said change in the displayed image data is a change in brightness or chroma of the image data.

14. A digital camera comprising:

a taking lens;

an image sensor for receiving light from the taking lens to produce an image data;

a display for displaying the image data produced by the image sensor;

a recorder for recording the image data produced by the image sensor into a recording medium;

an instruction member for providing an instruction to record an image data into the recording medium;

an optical element disposed so as to be situated in an advanced position that intersects an optical path leading from the taking lens to the image sensor and in a retracted position that is off the optical path;

a driver for moving the optical element to the retracted position when the instruction to record an image data is provided by the instruction member, and for moving the optical element to the advanced position after shooting of the image to be recorded into the recording medium is finished;

a memory for storing the image data produced by the image sensor before the movement of the optical element; and a controller for displaying the image data stored in the memory on the display when the optical element is moving.

15. A digital camera as claimed in claim 9, wherein gradually changing a characteristic of the image comprises changing the brightness of the image data.

16. A digital camera as claimed in claim 9, wherein gradually changing a characteristic of the image comprises changing the chroma of the image data.

* * * * *